A. W. COATES.
Spring-Chair.

No. 164,811. Patented June 22, 1875.

WITNESSES:
W. W. Hollingsworth
Solon C. Kemon

INVENTOR:
A. W. Coates
BY
ATTORNEYS.

UNITED STATES PATENT OFFICE.

AMOS W. COATES, OF ALLIANCE, OHIO.

IMPROVEMENT IN SPRING-CHAIRS.

Specification forming part of Letters Patent No. 164,811, dated June 22, 1875; application filed January 25, 1875.

*To all whom it may concern:*

Be it known that I, AMOS W. COATES, of Alliance, in the county of Stark and State of Ohio, have invented a new and Improved Spring for Chair-Seat; and I do hereby declare that the following is a full, clear, and exact description of the same, reference being had to the accompanying drawing, forming a part of this specification, in which—

Figure 1:
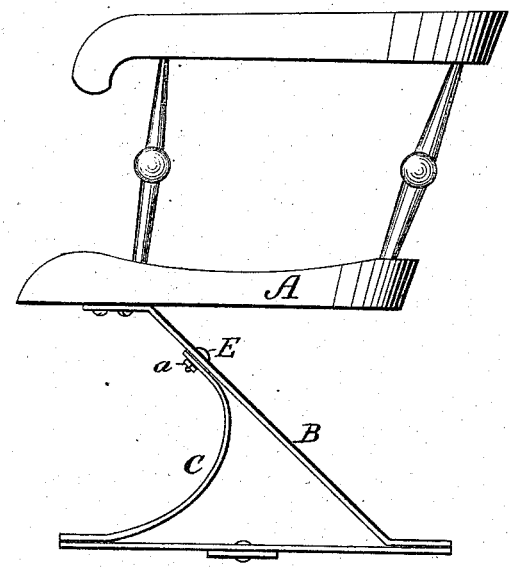
Figure 2:
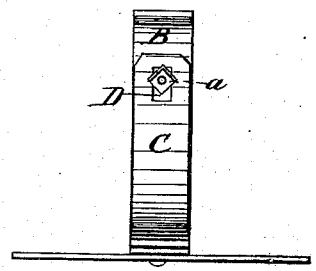
Figure 3:
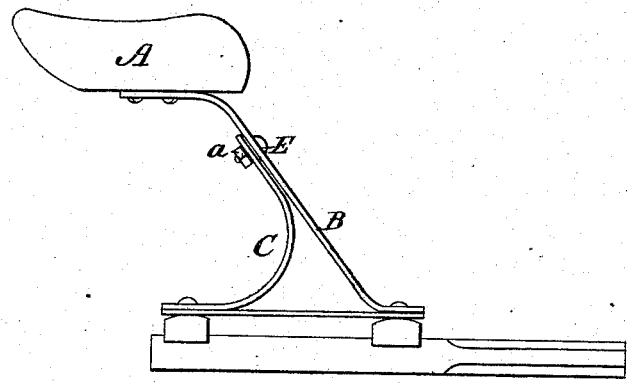
Figure 4:
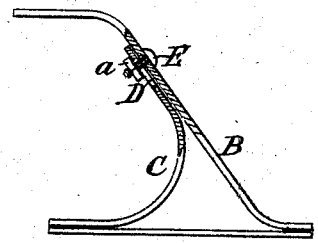

Figure 1 is a side elevation; Fig. 2, a front view of springs; Fig. 3, side elevation of a modification of the invention; Fig. 4, a sectional view of its springs.

The object of this invention is to adapt the supporting-spring of a chair-seat in a horse-rake, mower, or other analogous implement, to the different weights of the drivers, and, while preserving its elasticity, render the said spring strong enough to support a heavy driver without bearing down and changing its position, and thereby removing the driver from the most convenient place for operating his hand levers. It consists in the combination, with the ordinary-inclined band-spring, of an auxiliary spring attached to the base-frame, and connects with the mainspring near the seat by means of a stud, which is rigidly fixed to the mainspring, the said auxiliary spring being slotted at its connection with the stud, so that it does not act at all until the mainspring is borne down sufficiently low to cause its stud to rest in the lower part of the slot.

In the drawing, A represents the chair or seat for the driver. B is the mainspring, which, in Fig. 1, is inclined forward, and in Fig. 2, to the rear. Said spring is attached below to the frame-work of the implement, and above to the bottom part of the seat or chair. C is the auxiliary spring, which is made to subtend the angle formed by the mainspring with the frame-work for the purpose of re-enforcing the said mainspring to greatest advantage. D is a slot in the end of the auxiliary spring, which is made long enough to accommodate the ordinary vibration of the chair, and E is a stud rigidly attached to the mainspring, and loosely connecting with the same the auxiliary spring C, by means of a nut or tap, *a*.

By means of the above-described arrangement, the mainspring is made, under ordinary circumstances, to support the chair with the necessary amount of elasticity, and the auxiliary spring obviates any strain upon the mainspring by re-enforcing it whenever a heavy driver occupies the chair.

I am aware of the fact that auxiliary springs have been employed to re-enforce the springs which support seats for vehicles; but in the cases referred to, both springs act together—*i. e.*, when the weight of the driver bears down the seat, his weight is distributed upon both springs. The result of this is, that while the spring is strengthened and rendered capable of resisting a heavier weight, it is also stiffened, and what is gained in strength is lost in elasticity. I, therefore, disclaim the broad idea of an auxiliary spring, and confine myself to an auxiliary spring constructed and arranged as described, so that for an average-sized driver, the elasticity is as great as if but a single spring is used, while the arrangement of the slot and pin adapt the seat to very heavy drivers by re-enforcing the supporting-spring only when it is borne down unusually low.

Having thus described my invention, what I claim as new is—

The combination, with the supporting-spring B, of an auxiliary spring, C, loosely connected by means of a slot and pin with the supporting-spring, and operating with the same to re-enforce it only when the said supporting-spring is borne down below its usual range of vibration, substantially as described.

AMOS W. COATES.

Witnesses:
J. J. PARKER,
GEE. B. N. COATES.